United States Patent [19]
King, Jr.

[11] Patent Number: 4,704,717
[45] Date of Patent: Nov. 3, 1987

[54] RECEIVE MESSAGE PROCESSOR FOR A SOLICITED MESSAGE PACKET TRANSFER SYSTEM

[75] Inventor: Paul A. King, Jr., Needham, Mass.
[73] Assignee: Prime Computer, Inc., Natick, Mass.
[21] Appl. No.: 888,732
[22] Filed: Jul. 22, 1986
[51] Int. Cl.⁴ .............................................. H04J 3/26
[52] U.S. Cl. ........................................ 370/94; 370/85
[58] Field of Search ........................... 370/94, 60, 85; 340/825.5, 825.51

[56] References Cited

U.S. PATENT DOCUMENTS

| | | | |
|---|---|---|---|
| 4,281,380 | 7/1981 | De Mesa | 370/94 |
| 4,410,983 | 10/1983 | Cope | 370/85 |
| 4,476,467 | 10/1984 | Terwilliger et al. | 370/94 |
| 4,601,586 | 7/1986 | Bahr et al. | 370/94 |

Primary Examiner—Douglas W. Olms
Attorney, Agent, or Firm—Lahive & Cockfield

[57] ABSTRACT

A system for transferring solicited message packets between data processors coupled on a serial communications path. A solicitor processor includes a receiver message processor adapted to allocate portions of the solicitor processor memory for storing the header portions of received solicited and unsolicited data packets. The receive message processor identifies solicited data packets. For those message packets, predetermined allocated locations in the solicitor processor memory are identified from sub-portions of the header portions, and the data portions of those packets are then stored in the identified locations. Unsolicited data packets are identified as such, and are processed conventionally.

2 Claims, 4 Drawing Figures

RECEIVE MESSAGE PROCESSOR FOR A SOLICITED MESSAGE PACKET TRANSFER SYSTEM

REFERENCE TO RELATED APPLICATION

The subject matter of this application is related to that of U.S. patent application Ser. No. 579,090, now U.S. Pat. No. 4,601,586 entitled "Solicited message Packet Transfer System", filed Feb. 10, 1984. That application is incorporated by reference herein.

BACKGROUND OF THE INVENTION

The present invention is related to data processing systems, and more particularly to data processors coupled in a network configuration.

It is known to couple data processors on a serial communications path to form a network and to transfer data between those processors by means of addressed data packets, each including a header portion (defining the address of an intended "addressee" processor) and a data portion (containing a message intended for that addressee processor). In operation, conventionally, an addressee processor may monitor the communications path, identify a passing packet addressed to it, remove that packet from path, and then store that packet and subsequently retrieve, or copy, that packet for further processing as required. In following this course of action, the addressee processor must perform relatively high level processing activities dedicated to the desired processing (for example, demultiplexing of various header and message portions of the received packet to establish individual sessions).

While this approach does effectively permit communications among data processors in a network, those communications are achieved in a relatively inefficient manner in the prior art, due principally to the relatively high level processing activity required.

U.S. patent application Ser. No. 579,090 now U.S. Pat. No. 4,601,586 discloses a system for transferring message packets between data processors coupled on a serial communications path. In that system, each data Processor includes a central processing unit and an associated storage device, or memory. At least one of the data processors (a "solicitor processor") is adapted to allocate a portion of its memory for storage of so-called "solicited" message packets which might be solicited and received from at least one of the other data processors coupled to the communications path, a so-called "solicitee" processor. The solicitor data processor is further adapted to define a sequence of operations to be performed on any such received solicited message packets at that processor. At least one of these operations is the operation of storing a received solicited message packet in the allocated portion of memory.

In order to advise a solicitee processor how to communicate with the solicitor data processor, the solicitor processor is also adapted for transferring a solicited message parameter signal to the solicitee data processor on the communications path, where the solicited message parameter signal is representative of a predetermined header portion of solicited data packets which might be generated by the solicitee data processor and transferred over the communications path to the solicitor data processor. The header portion for a solicited message packet relates one or more of the sequences of operations which are to be associated with that packet. The solicited message parameter signal may be conventionally addressed to any or all of the other processors on the path. That signal may also be in the form of a solicited message packet itself, conformed to meet the parameters of a link to another solicitor processor on the path.

In the system, at least one of the other data processors coupled to the communications path is adapted to receive any solicited message parameter signal addressed to that other ("solicitee") data processor. That solicitee processor may be responsive to a received message parameter signal to generate a solicited message packet (with a header portion, as defined by the solicited message parameter signal) for transfer over the communications path to the solicitor processor. The solicitor processor is adapted to receive any such transmitted solicited message packet from the communications path, and to store that packet in the allocated portion of memory. Generally, the solicitor data processor is adapted to perform the various ones of the sequences of operations identified by the header portion of each received solicited message packet.

Thus, with the configuration of the system defined in U.S. patent application Ser. No. 579,909, now U.S. Pat. No. 4,601.586 a solicitor processor establishes a solicited packet link between itself and one or more other data processors coupled on the communications path. The solicited message packets have a header portion with a format specified by the solicited message parameter signal. The header portion for the respective solicited message packets may define the identity of storage locations in the solicitor data processor memory so that relatively little processing of any received solicited message packet is required to appropriately store the data portion of that message.

It is an object of the present invention to provide an improved receive message processor in a solicitor processor for a solicited message packet transfer system.

It is a further object to provide a receive message processor with a relatively highly efficient processing of received solicited message packets.

Another object is to provide a receive message processor for efficiently routing received solicited message packets to predetermined locations in the memory of a solicitor data processor.

SUMMARY OF THE INVENTION

Briefly, the present invention is a receive message processor of a solicitor data processor in a solicited message packet transfer system. The receive message processor is adapted to process received solicited message packets and received unsolicited message packets, where the solicited and unsolicited message packets each have a predetermined header portion. The solicited message packet header portion includes a first header sub-portion indicative of a solicited message packet and a second header sub-portion indicative of a memory location in the memory of the solicitor data processor. The unsolicited message packets include a first header sub-portion indicative of an unsolicited message packet and a second header sub-portion.

The receive message processor includes a receiving network, an allocating network, an indicating network, and a controller.

The receiving network is adapted for receiving message packets from a communications path of the solicited packet message transfer system.

The allocation network is adapted for allocating portions of the memory of the solicitor data processor to establish:

i. one or more frame descriptor locations for storing the first sub-portions of the header portions of received message packets, and for storing the second sub-portions of the header portions of received solicited message packets (and in some forms, second sub-portions of the header portions, if any, of received unsolicited message packets,
  ii. one or more unsolicited message locations for storing data portions of received unsolicited message packets,
  iii. one or more solicited message locations for storing data portions of received solicited message packets,
  iv. one or more solicited buffer descriptor locations for storing address signals representative of the address in the memory of the solicited message locations.

The indicator network is adapted for indicating whether a received message packet is an unsolicited or solicited message packet.

The controller is coupled to the receiving network and the memory. The controller is sequentially operative for a received message packet for storing the first and second sub-portions of the header portion of the packet at one of the frame descriptor locations, and then for decoding the first sub-portion stored at the frame descriptor location, to determine if the stored first sub-portion is indicative of a solicited message packet or an unsolicited message packet.

When the stored, decoded first sub-portion is representative of an unsolicited message packet, the controller successively:

a. sets the indicating network means to be indicative of a received unsolicited message packet, and
  b. stores the data portion of the received message packet at one of the unsolicited message locations, When the stored decoded first sub-portion is representative of a solicited message packet, the controller successively:

a. sets the indicating network to be indicative of a received solicited message packet,
  b. decodes the stored second sub-portion and identifies from that decoded second sub-portion an associated one of said solicited buffer descriptor locations,
  c. determines the address for the solicited message location stored at the identified solicited buffer descriptor, and
  d. directly stores the data portion of the received message packet at the solicited message location defined by the determined address.

Following storage of the data packet, the controller re-sets the indicating network and awaits the next received data packet from the receiving network.

With this configuration, the receive message processor provides a highly efficient routing of received solicited message packets directly to predetermined locations in the memory of the solicited message processor. No copying operation is required. Subsequent processing may then be performed in accordance with other characteristics of the solicited message packet transfer system, as set forth in application Ser. No. 579,090, now U.S. Pat. No. 4,601,586.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
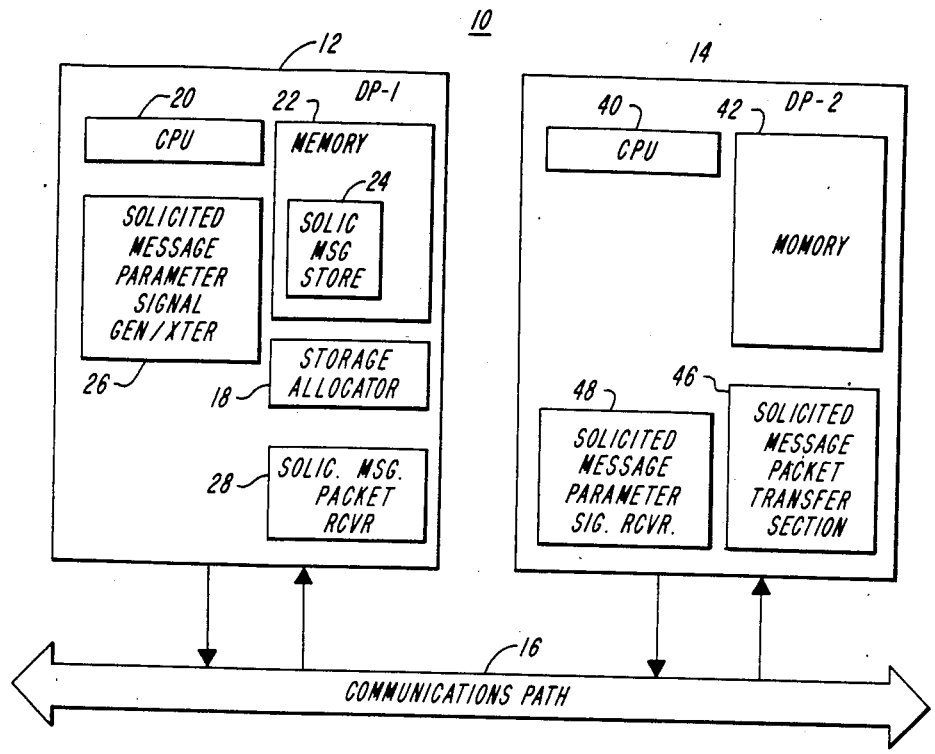
FIG. 1 shows in block diagram form, an exemplary system for transferring solicited message packets in accordance with the present invention.

FIG. 1 shows an exemplary system 10 for transferring solicited message packets between a plurality of data processors 12 and 14 coupled to a communications path 16 in accordance with the disclosure of U.S. patent application Ser. No. 579,090, and the present invention. In the illustrated embodiment, the data processor 12 is a "solicitor" data processor which expects to receive data packets which are solicited from the "solicitee" data processor 14. In alternative embodiments, either of these data processors may include similar components to those in the other, to permit two way solicited message packet transfer. Additional data processors coupled to the communications path 16 may also include the blocks illustrated in processors 12 and 14 which are necessary for such processors to be solicitor and/or solicitee processors. The various blocks in the data processors 12 and 14 are described herein as hardware but may alternatively be functionally embodied in the form of software (or firmware) stored and adapted for use in conjunction with the respective central processing units of those processors. As described more fully below, the present invention resides in the solicitor data processor 12.

The solicitor data processor 12 includes a central processing unit (CPU) 20, and an associated memory 22. As shown, the data processor 12 also includes a storage allocator 18 operative in conjunction with CPU 20 to allocate a portion of the memory 22 (denoted solicited message store 24) for the storage of solicited message packets to be received from data processor 14 (or other processors coupled to communications path 16). As described more fully below in conjunction with FIG. 2, the storage allocation 18 and CPU 20 are further operative to allocate in memory 22 Frame Descriptor Locations (FD) 24A, Solicited/Unsolicited Indicator Locations (S/U) 24B and solicited message Buffer Descriptor Locations (SMBD) 24C. Those allocated portions may be, but are not necessarily, contiguous in memory 22.

In the general case, the memory 22 also includes additional locations for storing received unsolicited messages from path 16, as well as other memory locations for other conventional utilization within processor 12.

The data processor 12 further includes a solicited message parameter signal generator 26 which is operative in response to commands from the central processing unit 20 to generate solicited message parameter signals addressed to selected data processors coupled to the path 16. The solicited message parameter signal defines a predetermined header portion for use by any solicitee processor in generating a solicited data packet to be sent from that solicitee processor, along path 16 to the data processor 12. Typically, that header might include an address representative of the identity of data processor 12, and a portion indicative of the "solicited" status of the data packet.

The data processor 12 is further adapted to define a sequence of operations to be selectively performed by processor 12 on received solicited message packets at that data processor. The sequences of operations include the storage of a received solicited message packet in the allocated solicited message store 24, and, by way of example, may further include the operation of causing the CPU 20 to interact with a process presently being performed. The particular sequences of operations to be performed in association with any received solicited message packet are dependent upon the content of the header portion of that packet.

Figure 2:
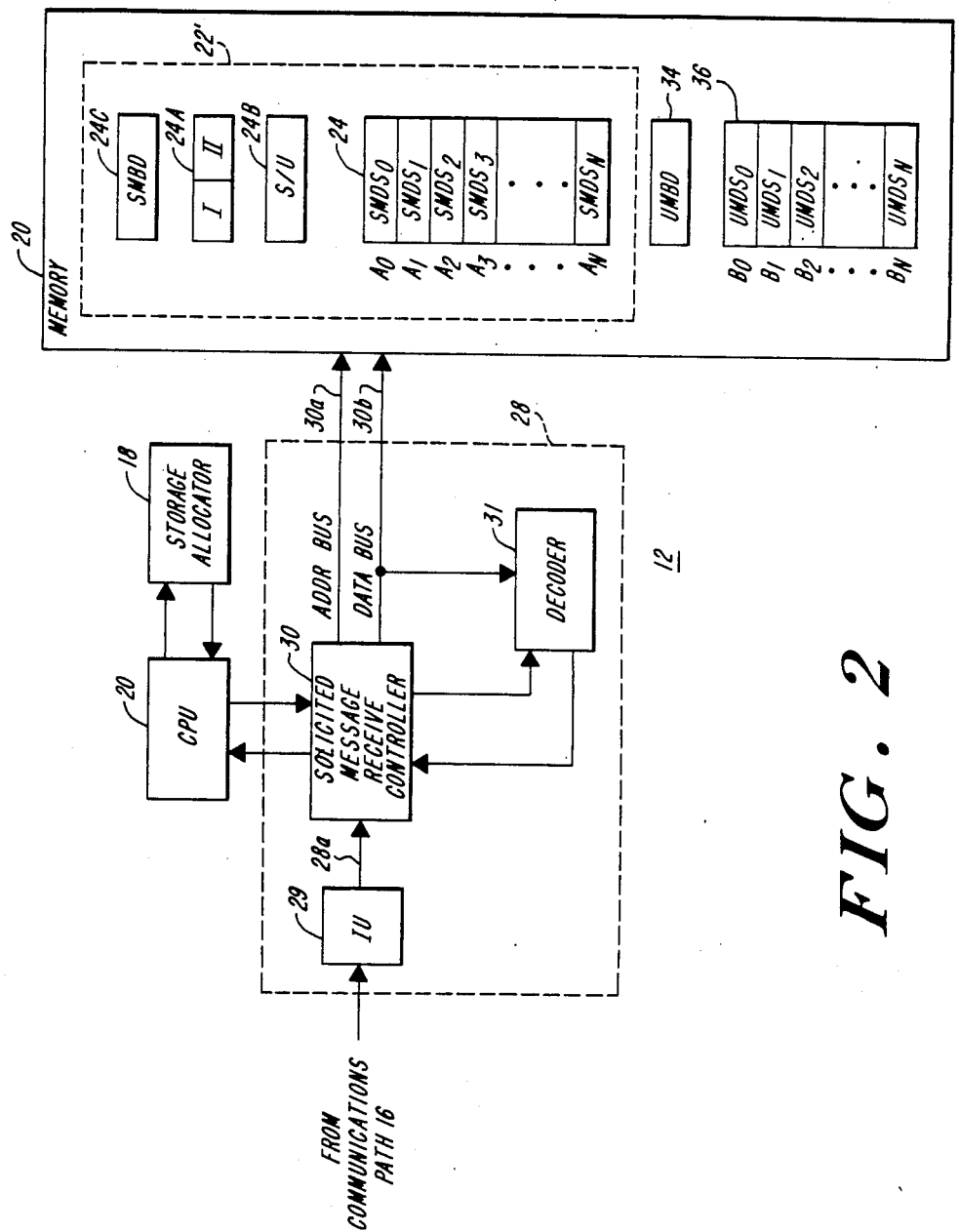
FIG. 2 shows in detailed block diagram form portions of the system of FIG. 1.

In accordance with the present invention, a receiver processor, shown in FIG. 2, is established in the solicitor processor 12 by the storage allocator 18, a portion 22' of the memory 22 (including solicited message store 24, Frame Descriptor (FD) 24A Solicited/Unsolicited Indicator (S/U) 24B and Solicited Message Buffer Descriptor (SMBD) 24c), the solicited message packet receiver 28 and the controller 20 (comprising the central processing unit, or CPU). In the preferred form of the invention, the receiver 28 comprises a conventional interface unit (IU) 29, a solicited Message Receive Controller 30 (for example, a type 82586 Ethernet Controller,, as manufactured by Intel), and a programmable Array Logic (PAL) Decoder 31 (for example, a PAL type 16 L8, as manufactured by National Semiconductor). The controller 30 is coupled to memory 22 conventionally by way of address bus 30b. The decoder 31 is also coupled to data bus 30b and to controller 30.

FIG. 2 also shows portions of memory 22 allocated for Unsolicited Message Buffer Descriptor Locations (UMBD) 34 and Unsolicited Message Data Storage Locations (UMBD) 36. The latter portions of memory 22 are allocated and controlled by CPU 20 in a conventional manner to establish of conventional-type storage unsolicited data packets from path 16.

Thus, with this configuration, the memory 22 is allocated as shown in FIG. 2 to include a set of Frame Descriptor Locations (FD) 24A, Unsolicited Message Data Store Locations (UMDS) 36, Unsolicited Message Buffer Descriptor (UMBD) 34, Solicited Message Data Store Locations (SMDS) 24, Solicited Message Buffer Descriptor Locations (SMBD) 24C, and Solicited/Unsolicited Indicator Location (S/U) 24B. In an alternate form of the invention, SMBD24C may be a separate RAM, S/U24B may be a flip flop in the PAL of decoder 31, and II of FD24A may be a separate register, apart from the main memory 22. Each message packet includes a header portion having a first sub-portion (I), a second sub-portion (II), and a data portion.

Figure 3:
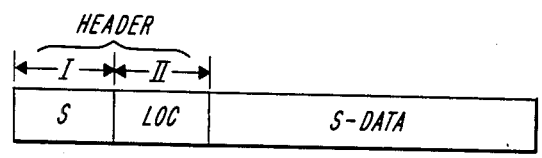
FIGS. 3 and 4 show exemplary formats of solicited and unsolicited data packets, respectively, for the system of FIGS. 1 and 2.
Figure 4:
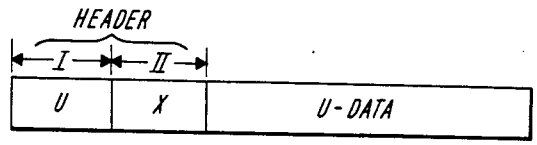

An exemplary solicited data packet format is shown in FIG. 3 to include first header sub-portion (denoted S), a second header sub-portion (LOC) and a solicited data portion (S-DATA). An unsolicited data packet format is shown in FIG. 4 to include a first sub-header portion (U), a second sub-header portion (X) and an unsolicited data portion (U-DATA). In other forms of the invention, the solicited data packet may include an additional field which may be intended to storage in the solicitor processor memory in conventional fashion.

In the illustrated embodiment, the Solicited Message Buffer Descriptor 24C stores a set of addresses (A0,A1,...,An) representative of a corresponding set of locations (SMDS0,SMDS1,..., SMDSn) in the solicited message data store portion of memory 22. Similarly, the Unsolicited Message Descriptor Buffer 34 stores a set of address (B0,B1,...,Bm) representative of a corresponding set of locations (UMDS0,UMDS1,...,UMDSm) in the pool of memory locations in memory 22. In various other embodiments, the memory 22 may be adapted to store unsolicited messages in other forms.

For the specific configuration of FIG. 2, an Intel 82586 Ethernet controller is used to establish Controller 30, and a type 16L8 PAL is used to establish Decoder 31, where the PAL is programmed is in accordance with conventional AMD PALSM techniques. In the present embodiment, where the type 82586 Controller is used to establish the Receive Message Controller 30, it is particularly advantageous to define a solicited message packet to include a field to be conventionally stored, in addition to the solicited message data which is directly stored in solicited message store 24. In such cases, the '586 pipeline read may be circumvented. In other forms of the invention, the format for solicited messages may be as shown in FIG. 3, where all message data is to be stored directly into store 24.

In operation, the processor 12 is generally controlled by the Controller 20. When a data packet is received at processor 12 from communications path 16, that packet is transferred by way of Interface Unit (IU) 29 and receive bus 28a to the Solicited Message Receiver Controller 30. Controller 30 transfers the header portion of that received packet to memory 22 for storage in the Frame Descriptor 24A. In various forms of the invention, the address of FD24A is in effect hard-wired into decoder 31 to permit identification of the times when the controller 30 is storing the header into FD24A. The sub-portion I of the header is decoded by decoder 31 and the S/U 24B is set to be indicative of the solicited or unsolicited status of the received data packet. In the event the packet is determined (from sub-portion I) to be solicited, S/U 24B is set to S, and in the event the packet is determined to be unsolicited, S/U 24B is set to U.

Thereafter, when the packet has been identified as unsolicited, the operation of processor 12 is conventional with respect to that packet. For example, the sub-portion II of the header stored in FD may or may not be utilized, and the data portion (U-Data) of that packet may be stored in various ones of unsolicited message data store locations 36 in accordance with the contents of the unsolicited message buffer descriptor 34, all under the control of Controller 20. Subsequent use may require copy operations.

When the data packet has been identified as a solicited data packet (that is, upon the setting of S/U 24B to S), decoder 31 latches or saves reads sub-portion II of the header portion in FD 24A. The decoder 31 decodes that sub-portion II to generate a receive buffer address signal (pointer) indicative of a location in SMBD 24C. The receive buffer pointer is transferred to receiver 28 which then reads the address signal stored at the corresponding location of SMBD 24C. This address signal is representative of one or more of addresses A0,A1,...,An for the various solicited message data store locations of memory portion 24. The controller 30 then continues with the storage process for the received solicited data packet by determining an address (that is, one of A0, A1,. . .,An) to store the S-Data in store 24. This address is determined by fetching the II portion from FD24A and obtaining the corresponding stored address from SMBD24C. The S-Data portion as received for the received data packet is then transferred directly over data bus 30b to the corresponding location in SMDS 24. The S/U 24B is then reset in preparation for the receipt of another packet by receiver 28. In the preferred form of the invention, the S/U24B is reset when the buffer size field is read by the 82586 of controller 30.

Thus, for a received solicited data packet, the S-Data portion of that packet is directly stored in one or more predetermined (as established by SMBD 24C) locations in memory 24, permitting further processing in accordance with other programming of the solicitor processor 12, as described more fully in the incorporated reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a solicitor data processor of a solicited message packet transfer system, the improvement comprising:
   a receive message processor for processing received solicited message packets and received unsolicited message packets, said solicited and unsolicited message packets each having a predetermined header portion, said solicited message packet header portion including a first header sub-portion indicative of a solicited message packet and a second header sub-portion indicative of a memory location in the memory of said solicitor data processor, and said unsolicited message packets including a first header sub-portion indicative of an unsolicited message packet, said receive message processor including:
   A. means for receiving message packets from a communications path of said system,
   B. means for allocating portions of the memory of said solicitor data processor to establish:
      i. one or more frame descriptor locations for storing said first sub-portions of the header portions of received solicited and unsolicited message packets, and for storing said second sub-portion of the header portions of received solicited message packets
      ii. one or more unsolicited message locations for storing data portions of received unsolicited message packets,
      iii. one or more solicited message locations for storing data portions of received solicited message packets,
      iv. one or more solicited buffer descriptor locations for storing address signals representative of the address in said memory of said solicited message locations,
   C. means for indicating whether a received message packet is an unsolicited or solicited message packet,
   D. a controller coupled to said receiving means and said memory, and including means sequentially operative for a received message packet:
      i. for storing said first and second sub-portions of the header portion of said packet at one of said frame descriptor locations,
      ii. for decoding said first sub-portion stored at said frame descriptor location, to determine if said stored first sub-portion is indicative of a solicited message packet or an unsolicited message packet,
      iii. when said stored, decoded first sub-portion is representative of an unsolicited message packet:
         a. for setting said indicating means to be indicative of a received unsolicited message packet, and
         b. storing the data portion of said received message packet at ones of said unsolicited message locations,
      iv. when said stored decoded first sub-portion is representative of a solicited message packet:
         a. for setting said indicating means to be indicative of a received solicited message packet,
         b. for decoding said stored second sub-portion and identifying therefrom an associated one of said solicited buffer descriptor locations,
         c. determining the address for the solicited message location stored at said identified solicited buffer descriptor location, and
         d. storing the data portion of said received message packet at the solicited message location defined by said determined address,
      v. following said data packet storage, for re-setting said indicating means and awaiting the next received data packet from said receiving means.

2. A receive message processor according to claim 1 wherein said header portion of said unsolicited message packets further includes a second header sub-portion, and wherein said allocating means includes for allocating the memory of said solicitor data processor to establish one or more frame descriptor locations for storing said second sub-portions of received unsolicited message packets.

* * * * *